(12) United States Patent
Valkenburgh

(10) Patent No.: US 7,694,831 B2
(45) Date of Patent: Apr. 13, 2010

(54) MOTORCYCLE WHEEL HOLDER

(75) Inventor: Charles Van Valkenburgh, Huntsville, AL (US)

(73) Assignee: Pit Bull Products, Inc., Huntsville, AL (US)

( * ) Notice: Subject to any disclaimer, the term of this patent is extended or adjusted under 35 U.S.C. 154(b) by 484 days.

(21) Appl. No.: 11/684,864

(22) Filed: Mar. 12, 2007

(65) Prior Publication Data

US 2008/0223999 A1    Sep. 18, 2008

(51) Int. Cl.
B62B 3/00    (2006.01)
(52) U.S. Cl. .................... 211/24; 280/645; 211/85; 248/150; 248/188.6
(58) Field of Classification Search ............. 211/20–24, 211/17, 195, 85; 248/129, 150, 166, 439, 248/188.6, 434; 280/651, 645, 47.19, 47.24, 280/47.35
See application file for complete search history.

(56) References Cited

U.S. PATENT DOCUMENTS

| | | | |
|---|---|---|---|
| 640,631 A * | 1/1900 | Conti | 211/22 |
| 1,412,126 A * | 4/1922 | Mansell-Phayre | 211/33 |
| 1,501,609 A * | 7/1924 | Linden | 280/1 |
| 3,958,786 A * | 5/1976 | Mann | 248/176.3 |
| 4,830,385 A * | 5/1989 | Wallick et al. | 280/35 |
| 5,353,892 A * | 10/1994 | Lu | 182/163 |
| 5,354,089 A * | 10/1994 | Sohrt et al. | 280/645 |
| 5,857,649 A * | 1/1999 | Eason | 248/164 |
| 5,941,398 A * | 8/1999 | Harris | 211/60.1 |
| 6,189,853 B1 * | 2/2001 | Kuhn | 248/676 |
| 7,198,158 B2 * | 4/2007 | Kao | 211/70.6 |
| 2003/0062328 A1 * | 4/2003 | Millard | 211/85.7 |
| 2003/0155747 A1 * | 8/2003 | Bridges | 280/652 |
| 2003/0183734 A1 * | 10/2003 | Barnes et al. | 248/188.6 |
| 2004/0020880 A1 * | 2/2004 | Kao | 211/70.6 |
| 2005/0161914 A1 * | 7/2005 | Noel Lo | 280/651 |
| 2006/0027999 A1 * | 2/2006 | Hardin et al. | 280/646 |
| 2006/0249637 A1 * | 11/2006 | Houldsworth | 248/166 |
| 2007/0007222 A1 * | 1/2007 | Kao | 211/70.6 |
| 2007/0273115 A1 * | 11/2007 | Anthony | 280/47.19 |

* cited by examiner

*Primary Examiner*—Darnell M Jayne
*Assistant Examiner*—Devin Barnett
(74) *Attorney, Agent, or Firm*—Adam K. Sacharoff; Much Shelist

(57) ABSTRACT

The present invention is a motorcycle wheel holder with the capability of holding four motorcycle wheels simultaneously. The holder is capable of being rolled around and folds into a closed configuration by rotating two arms into its main frame. The arms are lockable in the deployed or stored configuration via actuation of locking pins. The unique geometry of the invention allows it to be oriented vertically or horizontally.

16 Claims, 5 Drawing Sheets

FIGURE I

MOTORCYCLE WHEEL HOLDER

FIELD OF THE INVENTION

The present invention relates generally to an apparatus for storing motorcycle wheels or tires. More particularly, this invention pertains to an apparatus for storing approximately four motorcycle wheels for ready access and that folds into a compact configuration for its own storage or transport and which can be oriented both vertically and horizontally.

BACKGROUND OF THE INVENTION

There have been many different embodiments of motorcycle wheel storage devices over the years; some have been available commercially as shown by GP Tech, Ten-80 Racing and Tyrsox and some have been built as a one-of-a-kind embodiment to meet the needs of the individual motorcyclist.

Prior embodiments of motorcycle wheel holders have traditionally consisted of metal rod(s) onto which a motorcycle wheel is installed and held in place. Individual wheels have often been incorporated into the device to allow it to be moved around relatively short distances such as from a racer's team paddock area at a race track to a tire vendor within the paddock area of the same race track. Many of the devices have generally been capable of being folded or dismantled for compact storage and/or shipping.

Like prior embodiments, the present invention also uses metal rods to hold the motorcycle wheels, has wheels incorporated to allow it to be moved, and can be folded. Unlike prior embodiments, the present invention has unique features including the ability to fold the device for storage that utilizes two identical arms linked to a main frame with pivot pins and angle-locking pins, which allow both arms to fold parallel to the main frame for compact storage. Also, the special geometric arrangements of the two arms, main frame, wheels, and rubber feet allow the invention to be oriented vertically or horizontally with motorcycle wheels oriented directly above each other when the invention is oriented vertically and at equal distance from the ground/floor when the invention is oriented horizontally.

The size and proportions of the apparatus and its components can be altered to fit various applications. More motorcycle wheels can be accommodated with the use of longer rods. Details of the embodiment of the invention can be varied without varying the concept of the invention.

BRIEF SUMMARY OF THE INVENTION

Like prior embodiments of the motorcycle wheel holder, the present invention is a framework with rods capable of holding up to four motorcycle wheels for quick and ready access and it has wheels that allow it to be rolled around for local transport. The present invention has a geometry that makes it unique in two following ways that have never been seen in prior embodiments: i) it has two arms that hold motorcycle wheels that are identical and capable of being folded onto the main frame for compact storage and/or transport, and ii) it is capable of being used in a vertical or horizontal orientation.

The present invention has potential for wide spread applications including storage of wheels/tires for any wheeled vehicles such as cars, trucks, mini-bikes, or bicycles. This invention could also be used to hold or display any item capable of being held in such a manner. Other details and advantages of the present system are apparent in the following description, accompanying drawings and the claims.

In a first embodiment of the invention there is provided a motorcycle wheel holder or tire tree that includes a main frame with first and second main frame ends, and two diametrically opposed sides. The tire tree also includes a main bar that is secured to the first main frame end and is used for support on a surface. Pivotally attached to the main frame are first and second arms. The first arm is attached intermediate of the first and second main frame ends on one of the main frame sides while the second arm is attached about the second main frame end on the other main frame side such that the first arm and second arm project from the main frame from diametrically opposed sides. Each arm includes at least two rods projecting therefrom and each rod has a length suitable for receiving at least one motorcycle wheel. The tire tree further includes an arm bar for support on a surface secured to an end of one or more of the first and second arms, such that the motorcycle wheel holder is capable of being supported on the surface by positioning the main bar and arm bar on the surface.

The first embodiment may further include a pair of wheels attached to distal ends defined by the main bar such that the tire tree may be rolled across the surface. In addition the first embodiment may position the rods along parallel planes to each other in order to help balance the tire tree during use. Pads may also be positioned on the ends of the arm bars.

The first embodiment provides for the tire tree to be foldable into different usable positions. For example, the first and second arms may be moved into a first position such that the first arm and the main frame are angled towards the surface and the motorcycle wheels secured on the rods are aligned substantially vertically in relation to each other. Alternatively, the first and second arms may be moved into a second position such that the second arm and the main frame are angled towards the surface and the motorcycle wheels secured on the rods are aligned substantially horizontal in relation to each other.

One means that permits the arms to be moved in relation to the main frame is provided by having a pair of pivot plates secured to either side of the first and second arms about a pivotal connection to the main frame, each pair of pivot plates supports a pivotal connection between the main frame and either the first or second arms. Each pair of pivot plates includes a first aperture that aligns with an opening through the main frame when the first and second arms are moved against the main frame such that the tire tree is positioned into a substantially collapsed configuration. A pin is provided for insertion through the aligned first apertures and the opening in the main frame. Each pair of pivot plates also includes a second aperture that aligns with an opening through the main frame when the first and second arms are moved away from the main frame such that the tire tree is positioned into a substantially opened configuration. The pin would also be used to lock the tire tree into position.

In another embodiment the tire tree includes a frame assembly having a collapsible configuration for transportation and at least a first opened configuration for placement of the motorcycle wheels. The frame assembly has a main frame, first and second projecting arms, and means for separately connecting the main frame to each projecting arm such that the projecting arms are moveable in relation to the main frame. Each projecting arm further includes a pair of rods extending outwardly for holding the motorcycle wheels. The connecting means permits movement of the projecting arms against the main frame to define the collapsible configuration and the connecting means permits movement of the projecting arms away from the main frame such that an end of the first projecting arm and an end of the main frame are positioned substantially against a surface to define the first opened configuration which positions the pairs of rods in a vertical alignment.

Numerous other advantages and features of the invention will become readily apparent from the following detailed description of the invention and the embodiments thereof, from the claims and the accompanying drawings.

BRIEF DESCRIPTION OF THE DRAWINGS

A fuller understanding of the foregoing may be had by reference to the accompanying drawings, wherein.

DETAILED DESCRIPTION OF THE INVENTION

Figure 1:
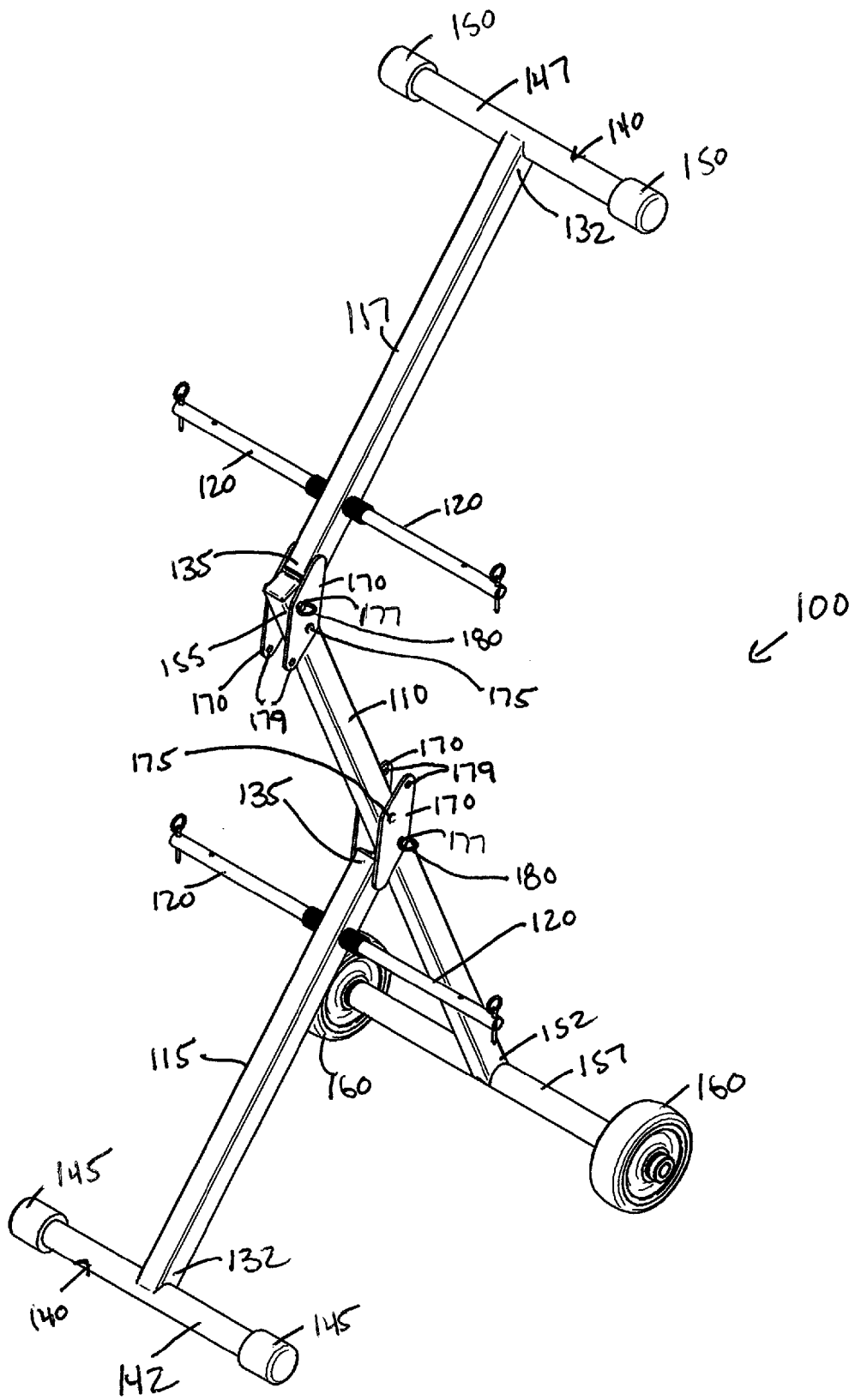
FIG. 1 is an isometric view illustrating the invention

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Figure 2:
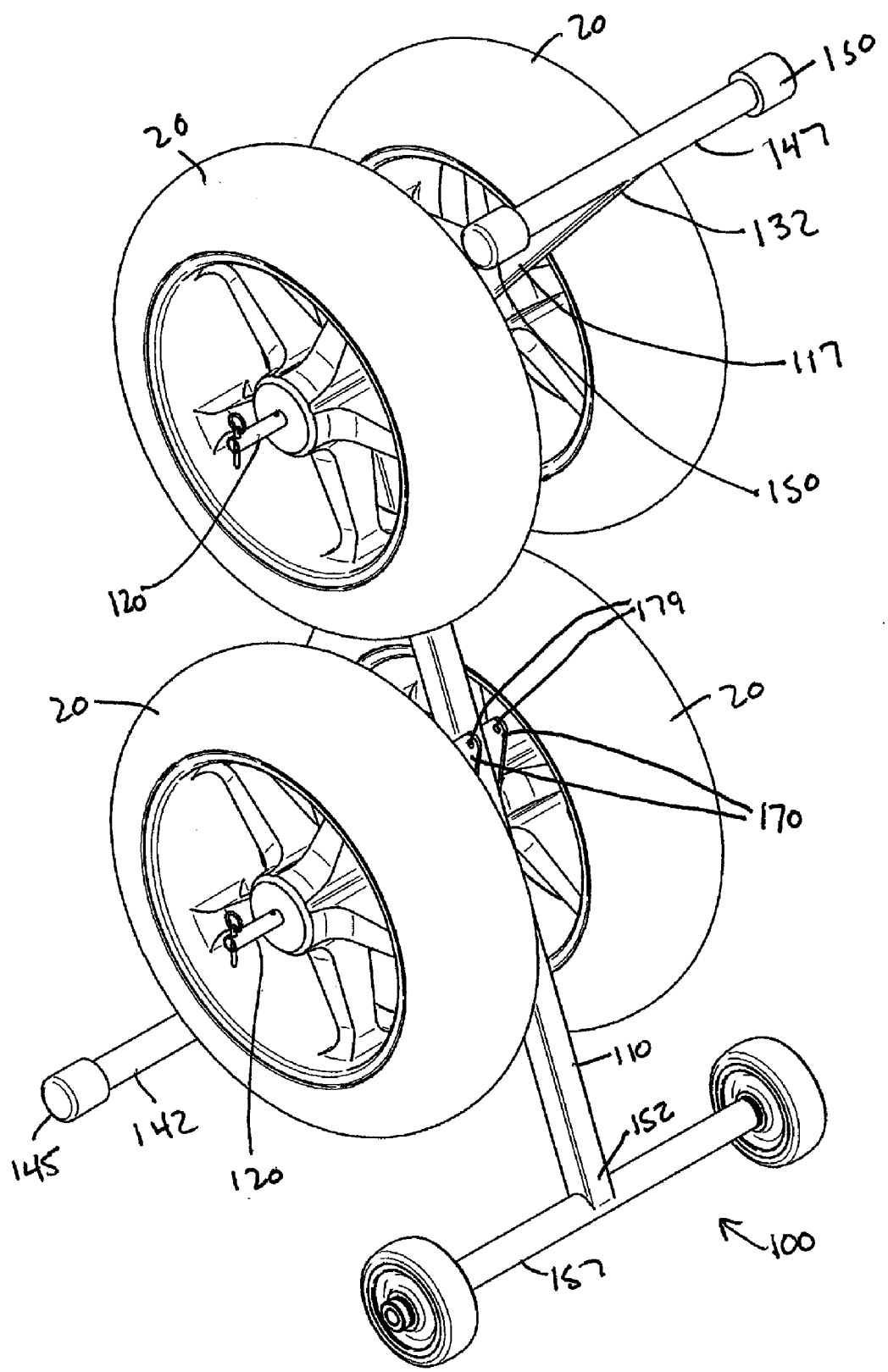
FIG. 2 is an isometric view illustrating the invention with four motorcycle wheels installed.

Referring to FIGS. 1 and 2, in one embodiment, the tire tree 100 consists of a central main frame 110 with two arms 115 and 117 projecting therefrom, referred to also as a first arm 115 and a second arm 117. The arms 115 and 117 may be identical and oriented to project from opposite sides of the main frame 110. The means for connecting the arms 115 and 117 to the main frame 110 is discussed further below.

Each arm 115 and 117 includes a pair of rods 120 projecting therefrom. Each rod 120 is capable of holding at least one motorcycle wheel 20. Safety pins 180 can be inserted through apertures on the rods 120 to secure and maintain the motorcycle wheels 20 thereon. The rods 120 are preferably positioned along parallel planes to each other in order to help balance the tire tree 100 when the motorcycle wheels 20 are loaded on the rods 120.

Positioned along the end 132 of each arm 115 and 117, opposite the end 135 of the arm 115 and 117 that is secured to the main frame 110, is an arm bar 140. The arm bars 140 are further defined for reference below as a first arm bar 142 that has first ends 145 and a second arm bar 147 that has second ends 150. In addition, positioned on one end 152 of the main frame 110, opposite the end 155 that is secured to the second arm 117, is a main bar 157. The main bar 157 has a pair of wheels 160 attached thereto.

Figure 3:
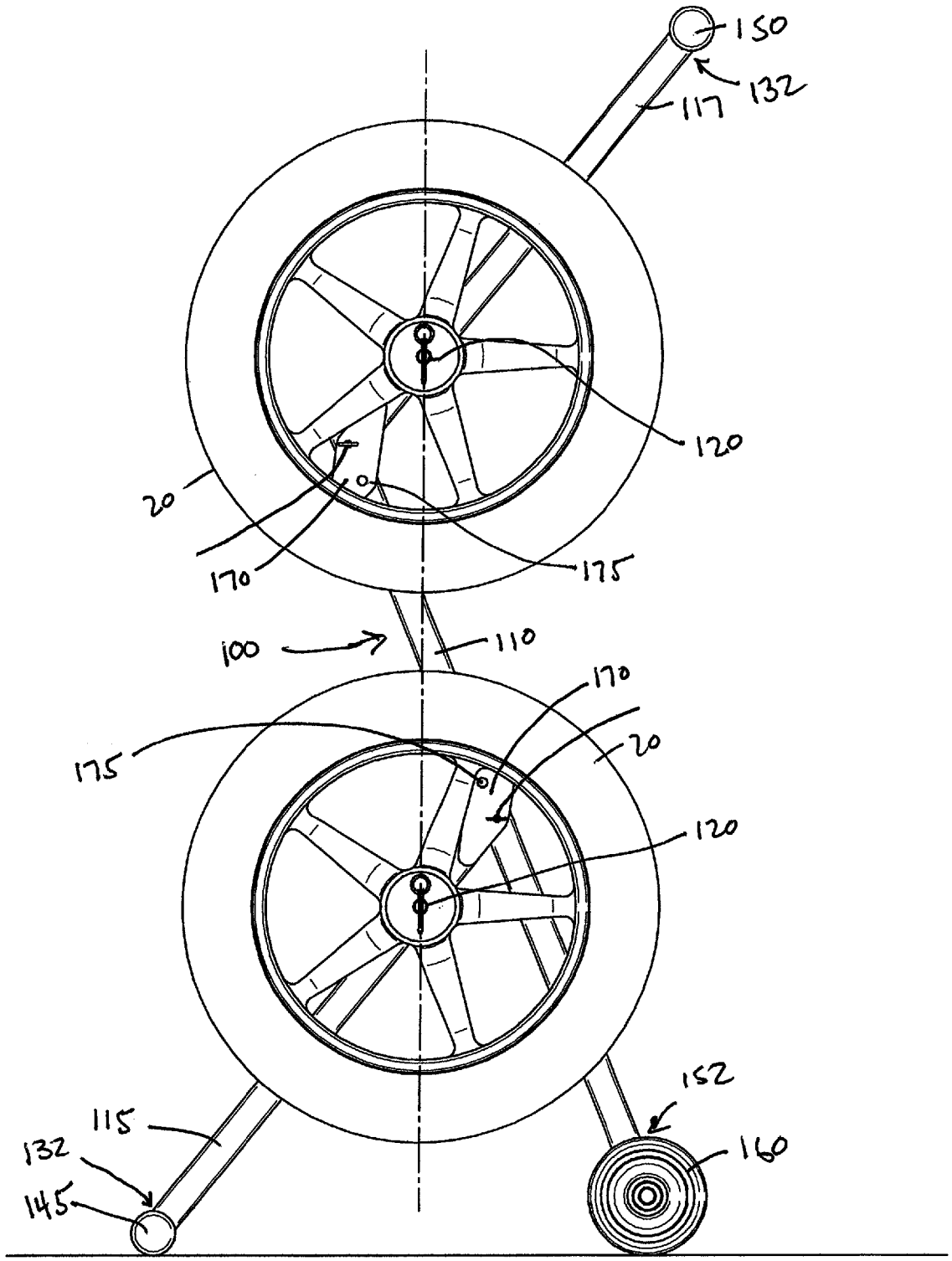
FIG. 3 is a side view showing the invention oriented vertically.
Figure 4:
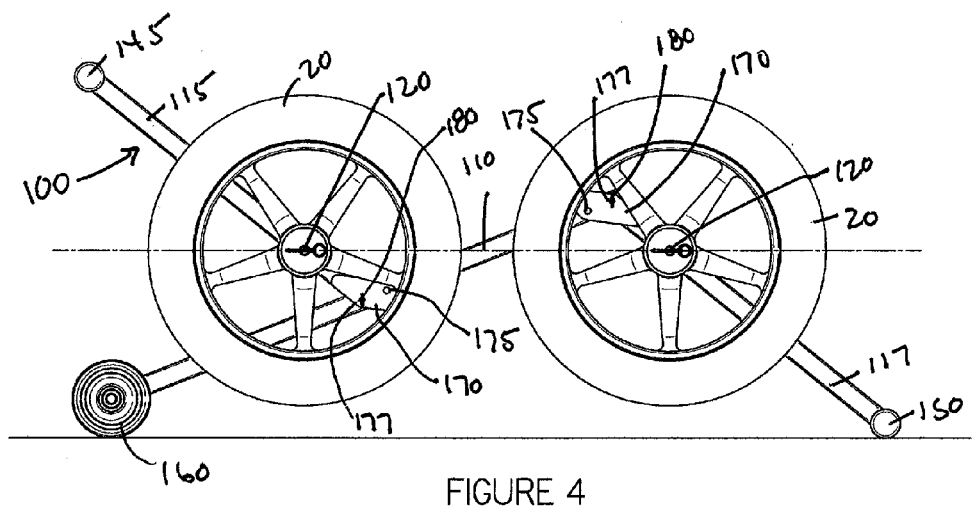
FIG. 4 is a side view showing the invention oriented horizontally

The tire tree 100 is able to rest on the ground at four points via the two wheels 160 that are attached to the main bar 157 and either the first ends 145 or the second ends 150. Both the first and second ends 145, 150 may include pads. Allowing the tire tree 100 to rest on the first pair of ends 145 orients it in a vertical orientation as shown in FIG. 3 and when it rests on the second pair of ends 150 it is oriented horizontally as shown in FIG. 4. As illustrated in FIGS. 3 and 4, in either orientation the rods 120 are aligned along a single plane.

Figure 5:
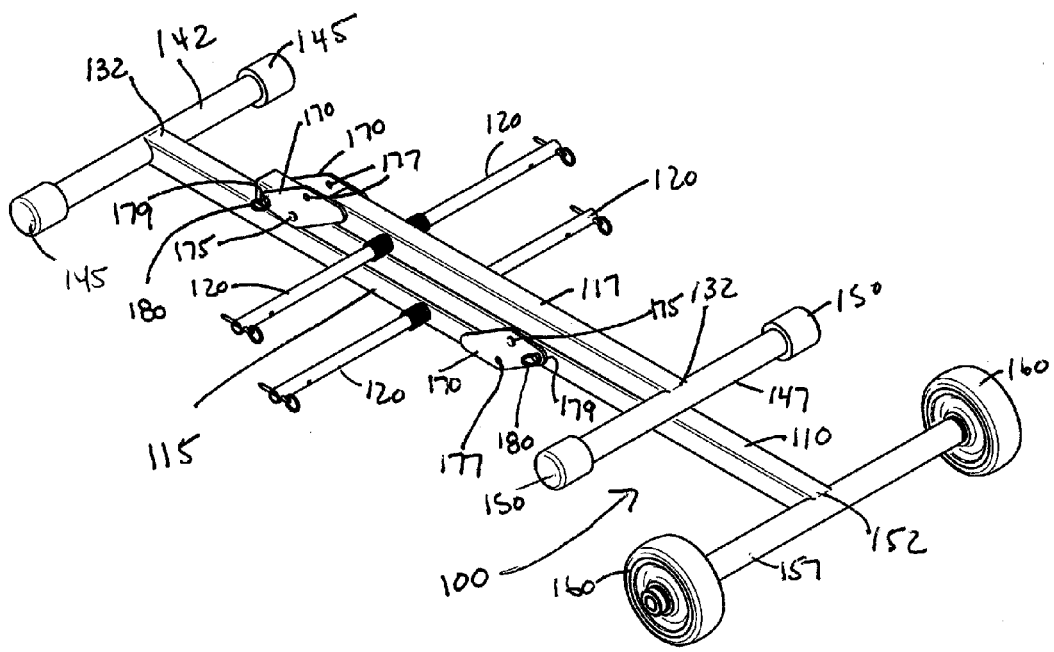
FIG. 5 is an isometric view showing the invention folded for storage/transport.
Figure 6:
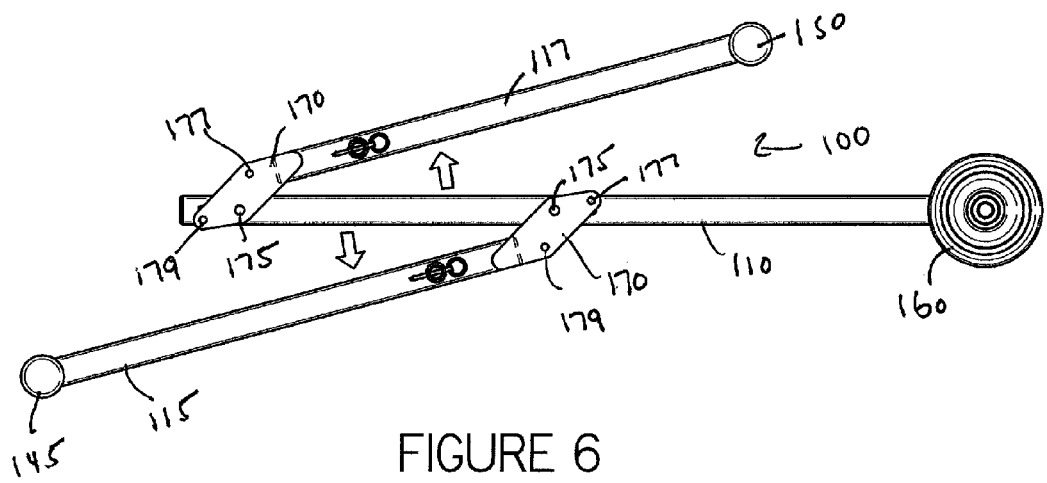
FIG. 6 is a side view showing the invention being deployed to the usable configuration.
Figure 7:
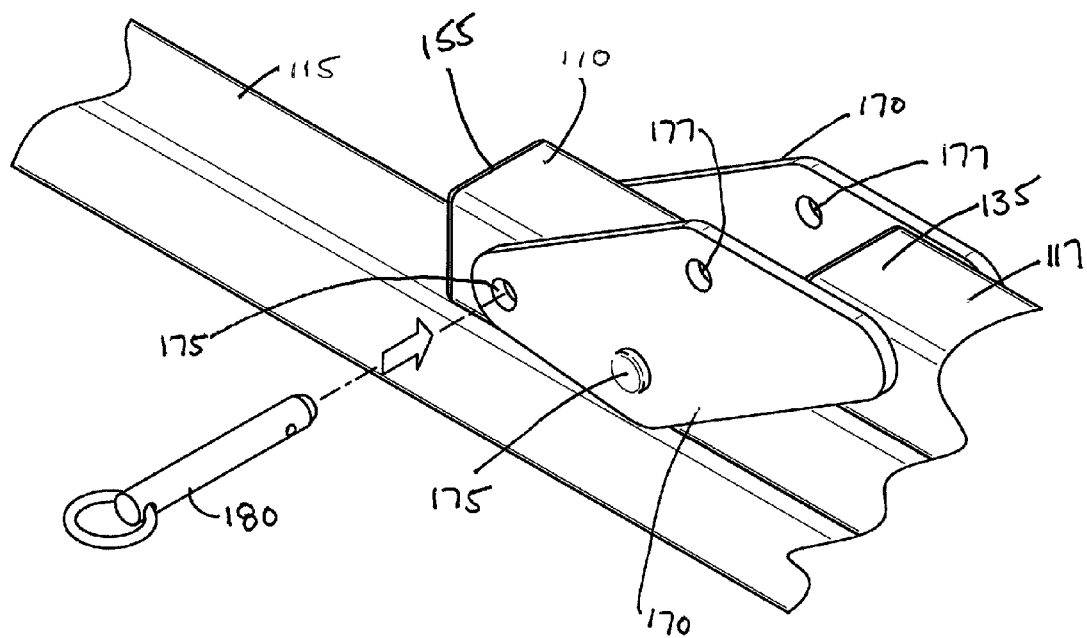
FIG. 7 is an isometric view showing the locking pin being inserted to hold one of the arms in the stored position.

For moving the tire tree 100 from the deployed position to the storage or transportation position, the tire tree 100 folds to a generally flat configuration as shown in FIGS. 5 through 7. When folded for storage, both arms 115, 117 are parallel and adjacent to the main frame 110. Each arm 115 and 117 includes two permanently attached pivot plates 170 that allow the arms to pivot about a pivot pin 175. Each pivot plate 170 has a pair of locking holes, a first locking hole 177 for when in a deployed position (FIGS. 1 and 4) and a second locking hole 179 for when in a stored position (FIG. 5). When in the deployed or stored position, the locking holes 177 and 179 align with locking holes through the main frame 110 and an angle locking pin 180 is inserted through either locking holes to prevent rotation of the arms 115, 117 (FIG. 7).

As further illustrated in FIG. 7, a means for connecting the main frame 110 to the arms 115 and 117 is shown through the connecting means depicted from the second arm 117. The connecting means may be defined by a pair of plates 170 pivotally attached to the main frame 110 and one of the arms 117 projecting from the main frame 110. The pair of plates 170 include a first pivot connection 175 which connects to the main frame and they include a second pivot connection which connects to the end 135 of the arm 117 that would be projecting there from.

Wheels 160 on the tire tree 100 allow it to be rolled around using one of the arms 115, 117 as a hand grip.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. A motorcycle wheel holder comprising:

a main frame bar having first and second main frame ends, and having at least two diametrically opposed sides, defined by a first side and a second side;

a main bar secured transversely to the first main frame end for support on a surface, and the main bar being transverse to the diametrically opposed sides of the main frame bar;

first and second arms comprising a pivotal connection to the main frame bar, the first arm having a pair of first arm ends and being attached intermediate of the first and second main frame ends at one of the first arm ends and having the other first arm end extending outwardly from the first side of the main frame bar, and the second arm having a pair of second arm ends and being attached about the second main frame end at one of the second arm ends and having the other second arm end extending outwardly from the second side of the main frame bar, such that both the first arm and the second arm project outwardly away from each other and outwardly away from the main frame bar from diametrically opposed sides;

at least two rods projecting transversely from each of the first and second arms and projecting such that the two rods are transverse to the diametrically opposed sides, each rod having a length suitable for receiving an axle bore defined by a motorcycle wheel; and an arm bar for support on a surface being transversely secured separately to each of the other first arm end and the other second arm end of the first and second arms, respectively, such that the motorcycle wheel holder is capable of being supported on the surface by positioning the main bar and one of the arm bars on the surface.

2. The holder of claim 1 further comprising a pair of wheels attached to distal ends defined by the main bar.

3. The holder of claim 1, wherein the rods, the main bar, and the arm bars being positioned substantially parallel to each other, and the first and second arms and the main frame bar being positioned substantially parallel to each other.

4. The holder of claim 2, wherein each arm bar includes pads on the ends thereof.

5. The holder of claim 3, wherein the holder is movable into a first position defined by having the arm bar secured to the first arm and the main bar in proximity with a surface such that the rods are aligned substantially vertically in relation to each other and along a single first plane and movable into a second position defined by having the arm bar secured to the second arm and the main bar in proximity with the surface such that the rods are aligned substantially horizontally in relation to each other and along a single second plane.

6. The holder of claim 1 further comprising a pair of pivot plates secured to either side of the first and second arms about the pivotal connection to the main frame, each pair of pivot plates supports the pivotal connection between the main frame and either the first or second arms.

7. The holder of claim 6, wherein each pair of pivot plates includes a first aperture that aligns with an opening through the main frame when the first and second arms are moved against the main frame such that the holder is capable of being positioned into a substantially collapsed configuration and further including a pin capable of insertion through the aligned first apertures and the opening in the main frame.

8. The holder of claim 6, wherein each pair of pivot plates includes a second aperture that aligns with an opening through the main frame when the first and second arms are moved away from the main frame such that the holder is capable of being positioned into a substantially opened configuration and further including a pin capable of insertion through the aligned first apertures and the opening in the main frame.

9. A motorcycle wheel holder comprising:

a frame assembly having a collapsible configuration for transportation and at least a first opened configuration for placement of the motorcycle wheels, the frame assembly having a main frame bar, first and second projecting arms, and means for separately connecting the main frame bar to each projecting arm such that the projecting arms are moveable in relation to the main frame bar, the projecting arms and the main frame bar being moveably secured to each other substantially along a single first plane, each projecting arm further includes a pair of rods extending transversely from the projecting arms and outwardly for holding the motorcycle wheels, the pairs of rods being secured to the projecting arms substantially along a single second plane and being adapted to receive motorcycle wheels, and wherein the connecting means permits movement of the projecting arms and the main frame bar against each other to define the collapsible configuration and wherein the connecting means permits movement of the projecting arms away from the main frame bar such that an end of the first projecting arm and an end of the main frame bar are positioned substantially against a surface to define the first opened configuration which positions the pairs of rods in a vertical alignment.

10. The holder of claim 9, wherein the frame assembly has a second opened configuration for placement of the motorcycle wheels and the connecting means permits movement of the projecting arms away from the main frame bar such that an end of the second projecting arm and the end of the main frame bar are positioned substantially against a surface to defined the second opened configuration which positions the pairs of rods in a horizontal alignment.

11. The holder of claim 10, wherein the first and second projecting arms include transverse bars attached at one end of each of the first and second projecting arms wherein a third the transverse bar is attached to the main frame bar and the transverse bar attached to the first or second projecting arm is capable of being positioned against the surface to support the holder in the first of second opened configurations.

12. The holder of claim 11, wherein the transverse bar attached to the main frame bar includes a pair of wheels.

13. The holder of claim 11, wherein the transverse bars attached to the first and second projecting arms include a pair of pads.

14. The holder of claim 9, wherein the connecting means are a pair of plates pivotally attached to the main frame bar and one of the projecting arms, the pair of plates include a first pivot connection to the main frame bar and a second pivot connection to the projecting arm.

15. The holder of claim 14, wherein the pair of plates further includes a pair of openings that align with openings on the main frame bar when the frame assembly is moved into the collapsible configuration or the first opened configuration, and the frame assembly further includes a pin for insertion into the aligned openings.

16. The holder of claim 9, wherein the first projecting arm is connected intermediate of ends defined by main frame bar while the second projecting arm is connected about an end of the main frame bar opposite said end positionable on said surface.

* * * * *